United States Patent Office

2,910,460
Patented Oct. 27, 1959

2,910,460

HOMOGENEOUS POLYETHYLENE

Robert S. Aries, New York, N.Y.

No Drawing. Application December 27, 1955
Serial No. 555,292

3 Claims. (Cl. 260—94.9)

The present invention relates to the provision of a novel polymer of ethylene having particularly valuable characteristics making it especially suited for molding, extrusion, casting and spinning. More particularly, the present invention relates to a novel polymer of ethylene characterized by a high melting point, a high average molecular weight, a high uniformity of molecular weight, and a relationship between tensile strength (flexural and impact) and melt viscosity which is different from and superior to that of all other polyethylenes heretofore known.

Ethylene has heretofore been polymerized through the use of high pressure to produce a white solid product having a generally greasy feel. A more recent polymerization technique which is described and claimed in my copending application Serial No. 550,761, filed December 2, 1955, now abandoned, utilizes lower pressures and more moderate temperatures, the polymerization being advanced by means of special catalysts. The product so obtained is superior in many respects to that derived by the high pressure method. The following table compares the properties of the products obtained by these methods:

TABLE I

| | High Pressure | Low Pressure |
|---|---|---|
| Density (depending upon degree of crystallinity) | 0.85–0.93 | 0.86–0.96 |
| First order transition point (melting point, ° C.) | 108–112 | 132–136 |
| Flow temperature, ° C. | 105–107 | |
| Second order transition point (brittle point, ° C.) | −70 | −70 |
| Index of refraction (approx.) | 1.51 | 1.51 |
| Osmotic (number average) molecular weight ($\overline{M}_n$) (approx.) | 20,000–25,000 | 20,000–several 100,000 |
| Intrinsic viscosity | $1.35 \times 10^{-4} (\overline{M}_n)^{.83}$ | $6.8 \times 10^{-4} (\overline{M}_n)^{.68}$ |
| Melt viscosity | $1.2 \times 10^{-11} (\overline{M}_n)^{3.2}$ | $1.1 \times 10^{-13} (\overline{M}_n)^{3.8}$ |
| Melt viscosity-temperature relation E–11.5 Kg. cal./flowing volume | $1.2 \times 10^{-15} x \exp (E/RT)(\overline{M}_n)^{3.2}$ | |
| Impact strength (Izod) ft. lb./in. about | 15 | 25 |
| Tensile strength, p.s.i.: | | |
| at −70° C. | 7,000–8,000 | 7,000–12,000 |
| at 25° C. | 1,200–1,500 | 4,000–10,000 |
| at 80° C. | 800–1,000 | 2,000–6,000 |
| at 110° C. | | 1,500–3,000 |
| Flexural strength, p.s.i. | | |
| at 25° C. | 1,500–2,000 | 5,000–10,000 |
| at 70° C. | | 3,000–7,000 |
| Tear resistance at 25° C., lb./in. | 400–500 | 500–1,200 |
| Modulus of elasticity, rigidity, p.s.i. | 15,000–20,000 | 100,000–150,000 |
| Rockwell hardness | R20 | R60 |
| Dielectric constant: | | |
| at 60 cycles | 2.3 | 2.3 |
| at $10^6$ cycles | 2.5 | 2.4 |
| Power factor: | | |
| at 60 cycles | 0.0004 | 0.0004 |
| at $10^6$ cycles | 0.0004 | 0.0006 |
| Volume resistivity, ohm/cm. | $10^{15}$ | $10^{14}$ |
| Moisture permeability, gr./hr./cm.²/mm. Hg | $0.5 \times 10^{-8}$ | about $10^{-10}$ |

The foregoing comparison of properties clearly indicates that while the "high pressure" polyethylene is useful for many purposes, it is deficient in having a relatively low melting point and a relatively low mean molecular weight of 25,000 which latter is directly responsible for low ultimate strength properties such as tensile strength, flexural strength, tear resistance and impact strength.

The conventional "low pressure" polyethylene is distinguished from the "high pressure" polymer by its higher melting point, its superior stiffness and its relatively high molecular weight which permits fabrication of articles of higher tensile, bending and bursting strengths. These "lower pressure" polymers however, still suffer from the deficiency of a high melt viscosity which limits their field of utility in certain respects, especially their working properties.

It is known that an important structural difference exists between the "high pressure" polyethylenes and the conventional "low pressure" polyethylenes. Researches of many workers have shown that the high pressure polyethylenes are highly branched macromolecules with few long and many short branches, so that a molecule of this type with a polymerization degree of approximately 1000 is far from being a linear chain but is rather a system of 5 or 6 equally long branches, each of which carries some 10 or 15 short branches of 4–6 carbon atoms.

Apparently the complicated branched structure of the high pressure polymer is particularly responsible for the low melting point (about 110° C.) and for a wide molecular weight distribution which is characterized by a $\overline{M}_w:\overline{M}_n$ (weight average molecular weight:number average molecular weight) ratio of more than 6 or 8:1 and sometimes even as high as 20:1, whereas the normal ratio for a vinyl-type polymer such as polystyrene has been found to be approximately 2. (The significance of the $\overline{M}_w:\overline{M}_n$ ratio is explained more fully hereinbelow.) This broad molecular weight distribution in turn is responsible for the sharp increase of melt viscosity with molecular weight as expressed by the exponent 3.2 in the relationship $$\text{Melt viscosity} = 1.2 \times 10^{-11} (\overline{M}_n)^{3.2}$$

Introducing the representative molecular weight of about 25,000 for normal commercial high pressure polyethylene into the above relationship we arrive at melt viscosities in the range of about 10,000 poises at 130° C. which permits satisfactory conditions of molding, casting, spinning and extrusion.

In contrast therewith, it has been found that the low pressure, low temperature polyethylenes consist of essentially linear macromolecules which may have a few long branches (5 or 6 per molecule) but do not have any short branches. This explains in a sufficiently satisfactory manner the higher degree of crystallinity, the higher density, higher melting point, lower moisture permeability and higher resistance to solvents. On the other hand, the low pressure, low temperature polyethylene resembles the normal high pressure material in that it also has a very wide molecular weight distribution as indicated by $\overline{M}_w:\overline{M}_n$ ratios as large as 8:1 and higher. This heterogeneous character in turn causes the steep rise of the melt viscosity with molecular weight as expressed by the large exponent 3.8 in the relationship $$\text{Melt viscosity} = 1.1 \times 10^{-13} \times (\overline{M}_n)^{3.8}$$

and this steep rise complicates the fabrication of articles exhibiting higher ultimate strength in stretching, bending, bursting and impact.

By way of illustration, the ultimate strength of a plastic material is given by $$\text{Tensile strength} = T_m - A/\overline{M}_n$$

where $T_m$=tensile strength of a material having an infinite molecular weight, and A is a characteristic constant for the material.

This means that mechanical strength is determined by the number of chain ends: the more chain ends there are in a given type of material the lower is its ultimate strength because chain ends interrupt the through-going chemical bonds and represent weak spots in the material.

Considering as a simple example three chains each made up of four monomeric units (Sample I), $$\underline{\phantom{XXX}4\phantom{XXX}}$$
$$\underline{\phantom{XXX}4\phantom{XXX}}$$
$$\underline{\phantom{XXX}4\phantom{XXX}}$$
Sample I The tensile strength is given by Tensile strength=$T_m$—6A since there are 6 chain ends. The melt viscosity is given by Melt viscosity=$K \times 3 \times 4^{3.8} = 3 \times 215K = 645K$ where K is a constant characteristic of the material but independent of the molecular weight.

If in place of Sample I we consider a heterogeneous product made up of the same number of monomeric units differently distributed amongst the same number of chains, $$\underline{\phantom{XXX}2\phantom{XXX}}$$
$$\underline{\phantom{XXX}2\phantom{XXX}}$$
$$\underline{\phantom{XXX}8\phantom{XXX}}$$
Sample II and with the same number of chain ends (Sample II), the tensile strength is the same as before, namely Tensile strength=$T_m$—6A since the number of chain ends of Sample II is the same as the number of chain ends in Sample I. The melt viscosity, however, is found as follows:

Melt viscosity=$K(2 \times 2^{3.8} + 1 \times 8^{3.8})$
$= K(2 \times 14 + 1 \times 1800) = 1828K$ showing that Sample II has about 3 times the melt viscosity of Sample I, although their tensile strengths are equal. The difference in melt viscosities is due to the fact that Sample I has a narrower molecular weight distribution than Sample II.

Experiments which I carried out with the conventional low pressure polyethylene reveal that their molecular weight distribution is very wide and that the curve representing this distribution exhibits two distinct peaks. Materials of such a type always show an unfavorable compromise between tensile strength and melt viscosity, namely a relatively low tensile strength at a given melt viscosity or a relatively high melt viscosity at a given tensile strength. Such materials correspond to Sample II because the presence of two separated peaks in the molecular weight distribution curve indicates that they are mixtures of a low molecular weight species and a high molecular weight species. The low molecular weight fraction has many chain ends per unit of volume or unit of weight and keeps the tensile strength at a low level, whereas the high molecular weight fraction forces the melt viscosity upward. The spread out character of the molecular weight distribution of the ordinary low pressure, low temperature polyethylenes is also responsible for the high ratio of weight average molecular weight to number average molecular weight (which has already been noted as about 8:1 or even higher) and the large exponent (3.8) in the equation which relates melt viscosity with number average molecular weight.

By way of explanation, the number average molecular weight, $\bar{M}_n$, of a polymer is defined by the equation $$\bar{M}_n = \frac{\int f(M) M dM}{\int f(M) dM}$$

or in more simple arithmetical terms, the number average molecular weight of a sample of a mixture containing various amounts of individual species of different molecular weights is found by multiplying the number of molecules of a given species by its individual molecular weight and finding the sum of all these products to give a numerator which is divided by the total number of molecules in the sample, the quotient being $\bar{M}_n$.

The weight average molecular weight, $\bar{M}_w$, of a polymer is defined by the equation $$\bar{M}_w = \frac{\int f(M) M^2 dM}{\int f(M) M dM}$$

or in more simple arithmetical terms, the weight average molecular weight of a sample of a mixture containing various amounts of individual species of different molecular weights is found by multiplying the number of molecules for a given species by the square of their individual molecular weight and finding the sum of all these products to give a numerator which is divided by the sum of a series of products found by multiplying each of the number of molecules for a given species by the molecular weights of the respective species.

It is pointed out that if the sample is perfectly homogeneous $\bar{M}_n$ and $\bar{M}_w$ are identical, but if the sample is heterogeneous $\bar{M}_w$ is larger than $\bar{M}_n$, and the ratio of $\bar{M}_w : \bar{M}_n$ is larger than 1.0, and the magnitude of this ratio is a measure of the heterogeneity of the sample.

Experimentally $\bar{M}_n$ is obtained by all those methods which count the individual molecules in a solution of the sample such as the direct measurement of the osmotic pressure, the vapor-pressure lowering, the boiling-point elevation, the melting point lowering or the determination of end-groups; $\bar{M}_w$ is obtained experimentally by measuring the light-scattering (turbidity) of the macromolecular solution or by the combination of sedimentation and diffusion.

It is therefore an object of the present invention to prepare a novel polyethylene exhibiting a distinctly narrower molecular weight distribution.

It is a further object of the invention to provide a novel polyethylene of high molecular weight, high density and high melting point but at the same time of low melt viscosity.

Another object of the invention is to provide procedures whereby such novel polyethylenes are obtained.

In accordance with the present invention I have found that a selective fractionation of conventional low pressure polyethylenes can be effected to thereby obtain polyethylene fractions, each fraction having the high melting point of the starting material and exhibiting a narrower molecular weight distribution and a smaller $\bar{M}_w : \bar{M}_n$ ratio.

I have further found that polyethylene compositions of improved properties can also be obtained by degrading a polyethylene having a wide molecular weight range so that a polyethylene having a reduced molecular weight range is obtained. The novel polyethylenes thus obtained though of a somewhat lower weight average molecular weight than the starting material have the same melting point and other desirable properties and in addition have certain beneficial properties not exhibited by the starting material itself.

The fractionation procedure is effected by dissolving polyethylene in xylene at elevated temperature. An organic material inert with respect to the polyethylene and the xylene, but soluble in or miscible with the xylene, is then added in increments with slight cooling. A first fraction is obtained of very high molecular weight, this fraction being distinctly more uniform than the starting material but nevertheless having a higher molecular weight and consequently also a higher melt viscosity. The organic liquid is then added in further increments with formation of a cloudy precipitate. Cooling aids in settling out of the precipitate which can then be separated by filtration or centrifugation, the residual solution being further diluted for separation of further fractions. All fractions obtained in this way are characterized by an extreme homogeneity in molecular weight, a closer approach of $\bar{M}_w$ and $\bar{M}_n$ i.e., a lower $\bar{M}_w:\bar{M}_n$ ratio, a low melt viscosity-molecular weight ratio, a high tensile strength-melt viscosity ratio, high melting point and other desirable properties as compared to the starting material.

Since polyethylenes of considerable molecular weight are substantially insoluble in all organic solvents except xylene and other aromatic hydrocarbons at elevated temperature, the precipitant can be any substance soluble in or miscible with the polyethylene solvent. Suitable materials include aliphatic hydrocarbons, alcohols, ethers, and the like. Normally solid substances which liquefy or dissolve in the solvent under the ambient conditions may also be employed as precipitants.

The degradation of heterogeneous polyethylene to produce a composition of narrow molecular weight range can be effected in solution by means of ultrasonic irradiation.

The following examples illustrate procedures for obtaining a novel polyethylene composition in accordance with the present invention:

*Example I*

1.5 grams of TiCl$_4$ were dissolved in 40 ml. of dry heptane and added to a flask provided with a mercury sealed stirrer and a nitrogen inlet tube to provide a dry nitrogen blanket. 0.6 gram of aluminum triethyl dissolved in an additional 40 ml. of heptane was added and the mixture stirred. The black suspension which formed was maintained in colloidal condition by stirring and dry oxygen-free ethylene was bubbled into the flask continuously with gradual formation of a dark colored polyethylene. After about 24 hours, absorption and polymerization of ethylene ceased. The soft solid in the flask was treated with methanolic HCl, transferred to a filter, washed successively with dilute methanolic HCl, methanol, and water yielding a white material. On drying at 80° C. under vacuum there was obtained 40 grams of a white powder soluble in xylene at elevated temperature.

*Example II*

1 gram of the dry polyethylene obtained in Example I was dissolved in 50 ml. of xylene at 95° C. Hot propanol was added gradually with vigorous stirring while permitting the solution to cool slightly. The dropwise addition of the propanol first caused a slight haze and then a gelatinous precipitate which was rendered fluffy and more easily filterable by reducing the temperature of the solution to 90° C. This first precipitate was filtered off and after drying in vacuum yielded 0.21 gram of a white fluffy powder.

The residual solution of polyethylene in xylene and propanol was again brought to 95° C., further hot propanol added dropwise until an approximately equal amount of precipitate had formed, the temperature reduced to 88° C., and the solution again filtered to produce a second fraction weighing 0.16 gram.

The procedure was repeated until five fractions were obtained, and the individual fractions (1–5) as well as the starting material (0) were separately dissolved in xylene at 95° C. and their properties determined. The results obtained are given in Table II.

TABLE II

| No. | Gram | $\bar{M}_n$* | $(\eta)$** | M.v. | $\bar{M}_w:\bar{M}_n$ |
|---|---|---|---|---|---|
| 0 | 1.0 | 60,000 | 1.19 | 1.2×10$^5$ | 8.0:1 |
| 1 | 0.21 | 110,000 | 1.82 | 3.8×10$^5$ | 2.5:1 |
| 2 | 0.16 | 80,000 | 1.48 | 2.1×10$^5$ | 2.8:1 |
| 3 | 0.17 | 50,000 | 1.07 | 3.0×10$^5$ | 2.6:1 |
| 4 | 0.27 | 40,000 | 0.91 | 1.1×10$^5$ | 2.2:1 |
| 5 | 0.17 | 15,000 | 0.47 | 7.8×10$^2$ | 2.2:1 |

*$\bar{M}_n$=osmotic molecular weight (number average).
**$(\eta)$=intrinsic viscosity.
M.v.=melt viscosity at 150° C. in poises.
$\bar{M}_w$=weight average molecular weight.

Thus in spite of the higher molecular weights of the fraction 2, its melt viscosity is far lower than that of the starting material and far lower than any other polyethylenes heretofore available. The tensile strength of fraction 2 is higher than that of the starting material. The ratio of $\bar{M}_w:\bar{M}_n$ of the new polyethylenes represented by the fractions is far lower than that of any material heretofore known.

While it is known that fractionation has been carried out with conventional high pressure polyethylenes, the low melting point and low molecular weight of such materials was incapable of producing any polyethylenes such as those of fractions 1, 2, 3 and 4, and in spite of a somewhat improved molecular weight distribution such high pressure polyethylene fractions do not have the desirable physical properties of my new polyethylenes.

The new polyethylenes of the present invention can also be prepared by ultra-sonic irradiation as shown in the following example:

*Example III*

2 grams of the polyethylene obtained in Example I were dissolved in 100 ml. of xylene at 90° C. A clear homogeneous solution was obtained which permitted the application of several experimental methods for the characterization of the dissolved polymer. Osmotic measurement gave a number average molecular weight of 70,000; light scattering measurements led to a weight average molecular weight of 560,000; the intrinsic viscosity was 1.36 whereas the melt viscosity of the polymer itself was 5.8×10$^5$ poises.

The solution was placed in an ultrasonic irradiator and exposed at 90° C. for 20 minutes to the influence of an ultrasonic field of 360,000 Hertz. After this exposure the polymer was precipitated by the addition of propanol, washed, dried and redissolved in xylene at 90° C. for the determination of the characteristic properties which were:

$$\bar{M}_n = 35,000$$
$$\bar{M}_w = 80,000$$
$$(\eta) = 0.81$$

Melt viscosity approximately 1.0×10$^3$ poises.

These data show that the molecular homogeneity of the polymer was greatly increased by the ultrasonic irradiation since the original $\bar{M}_w:\bar{M}_n$ of about 8:1 was reduced by the irradiation to 2.3:1. As a consequence the melt viscosity of the ultrasonically degraded material was about 1.0×10$^3$ poises whereas the melt viscosity of a normal low pressure, low temperature polyethylene with an osmotic molecular weight of 35,000 is about 2.0×10$^4$ poises. These data confirm the results of the fractionation experiments and prove that a low pressure, low temperature polyethylene having an $\bar{M}_w:\bar{M}_n$ ratio of about 2.3 is distinctly superior to a normal polymer of this type which has a ratio of 8:1 or more and that this ultrasonically treated material behaves essentially like the fractions of the Table II.

In accordance with the procedures outlined above it is therefore possible to obtain polyethylenes having an osmotic number average molecular weight in excess of 25,000 and a narrow molecular weight distribution as evidenced by $M_w:M_n$ ratios below 4 and usually below 3. With the fractionation technique it is even possible to obtain number average molecular weights of about 40,000 to 80,000 with $M_w:M_n$ ratios as low as 2. These new types of polyethylenes made by fractionation or by degradation have high melting points, i.e., in excess of about 128° C., have extremely desirable physical properties such as superior tensile strength and comparatively low melt viscosities which latter in large measure facilitates the fabrication of articles at low cost and with great ease. Specifically, the melt viscosities of these new materials are below $10^5$ poises at 150° C. and often range between $10^3$ and $10^4$ poises, or even lower, while the molecular weight is about 60,000.

Various changes and modifications may be made without departing from the spirit and scope of the present invention and it is intended that such obvious changes and modifications be embraced by the annexed claims.

What I claim is:

1. The process for fractionating polyethylene having a ratio of weight average molecular weight to number average molecular weight of less than about 4, which comprises dissolving in liquid xylene polyethylene having a weight average molecular weight to number average molecular weight ratio greater than about 4, a number average molecular weight in excess of about 25,000 and a melting point in excess of about 125° C., adding to said solution a volatile liquid non-solvent for said polyethylene which liquid is soluble in xylene, said liquid being added in quantity sufficient to precipitate a first fraction of said polyethylene, cooling the solution and separating the precipitated first fraction, adding further liquid to the solution to precipitate a second fraction of polyethylene while leaving a third fraction in said solution, cooling said solution and separating said second fraction, and separately heating said precipitated polyethylene fractions to drive off any xylene and volatile liquid non-solvent adhering thereto.

2. The process defined in claim 1, wherein said volatile liquid non-solvent comprises propanol.

3. The process which comprises forming a solution of polyethylene having a weight average molecular weight to number average molecular weight ratio greater than about 4, a number average molecular weight in excess of about 25,000 and a melting point in excess of about 125° C., subjecting said solution to ultra-sonic irradiation whereby polyethylene molecules of high molecular weight are broken down, and recovering the polyethylene from said solution.

References Cited in the file of this patent

UNITED STATES PATENTS

| | | |
|---|---|---|
| 2,313,144 | Gomm et al. | Mar. 9, 1943 |
| 2,457,238 | Hunter et al. | Dec. 28, 1948 |
| 2,721,189 | Anderson et al. | Oct. 18, 1955 |
| 2,802,814 | Feller et al. | Aug. 13, 1957 |
| 2,816,883 | Larcher et al. | Dec. 17, 1957 |
| 2,825,721 | Hogan et al. | Mar. 4, 1958 |
| 2,862,917 | Anderson et al. | Dec. 2, 1958 |

FOREIGN PATENTS

| | | |
|---|---|---|
| 533,362 | Belgium | May 15, 1955 |

OTHER REFERENCES

Flory: J. Am. Chem. Soc., vol. 62, pages 1057–1140, May 1940.

"Natural and Synthetic High Polymers" (Meyer), vol. IV, Interscience Publishers Inc. (New York), 1950, page 710.

"Mechanism of Polymer Reactions" (Burnett), vol. III, Interscience Publishers Inc. (New York), 1954, page 394.